(12) United States Patent
Oikawa

(10) Patent No.: US 7,269,314 B2
(45) Date of Patent: Sep. 11, 2007

(54) DISPERSION COMPENSATION DEVICE

(75) Inventor: Yoichi Oikawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 36 days.

(21) Appl. No.: 11/048,816

(22) Filed: Feb. 3, 2005

(65) Prior Publication Data

US 2006/0127001 A1    Jun. 15, 2006

(51) Int. Cl.
*G02B 6/32* (2006.01)
(52) U.S. Cl. .............................. 385/33; 385/28; 385/50
(58) Field of Classification Search ............ 385/27–28, 385/33, 39, 50
See application file for complete search history.

(56) References Cited

U.S. PATENT DOCUMENTS

| 5,185,827 A | 2/1993 | Poole .......................... 385/28 |
| 2004/0047551 A1* | 3/2004 | Ramachandran ............. 385/28 |

FOREIGN PATENT DOCUMENTS

| JP | 7-63938 | 3/1995 |
| JP | 2002-507778 | 3/2002 |
| WO | WO99/49340 | 9/1999 |
| WO | WO99/49341 | 9/1999 |
| WO | WO99/49342 | 9/1999 |

* cited by examiner

*Primary Examiner*—Frank G. Font
*Assistant Examiner*—Michael P. Mooney
(74) *Attorney, Agent, or Firm*—Staas & Halsey LLP

(57) ABSTRACT

The present invention is a dispersion compensation device capable of varying dispersion compensation amount with a simple configuration. The device includes a first mode light conversion section capable of converting input light into light of higher mode, a dispersion compensation section capable of performing dispersion compensation on the higher mode light outputted from the first mode light conversion section corresponding to the status of mode of the higher mode light, a second mode light conversion section capable of converting the light of higher mode dispersion-compensated in the dispersion compensation section into light of original mode, and a mode control section capable of variably controlling the status of mode of the higher mode light converted in the first mode light conversion section, and controlling to convert the higher mode light from the dispersion compensation section to the light of original mode in the second mode light conversion section.

26 Claims, 8 Drawing Sheets

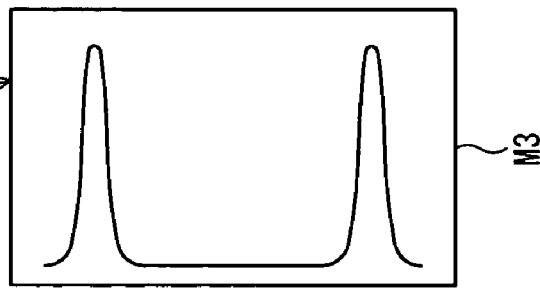
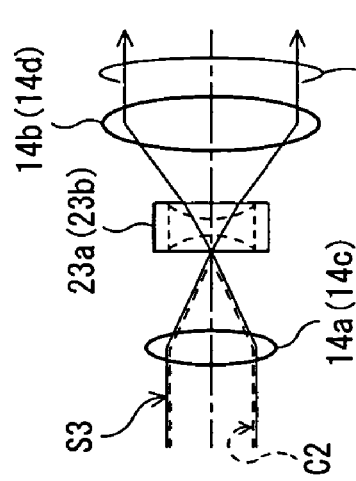
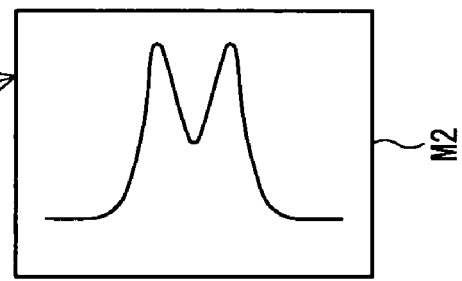
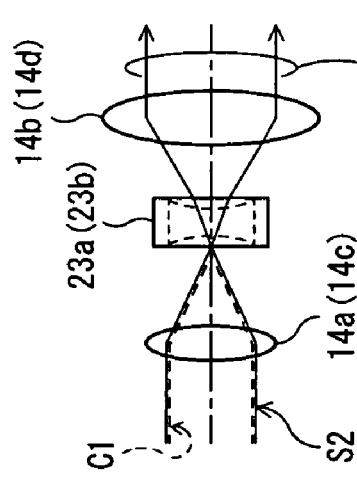
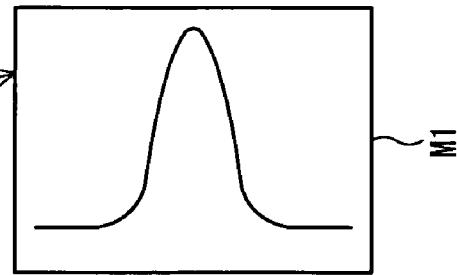
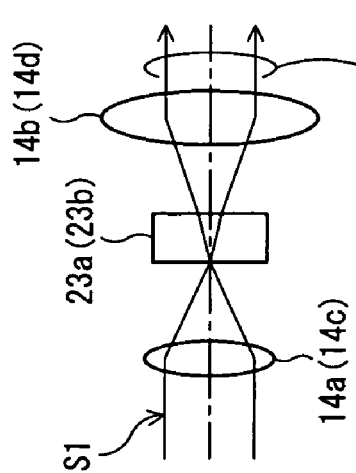

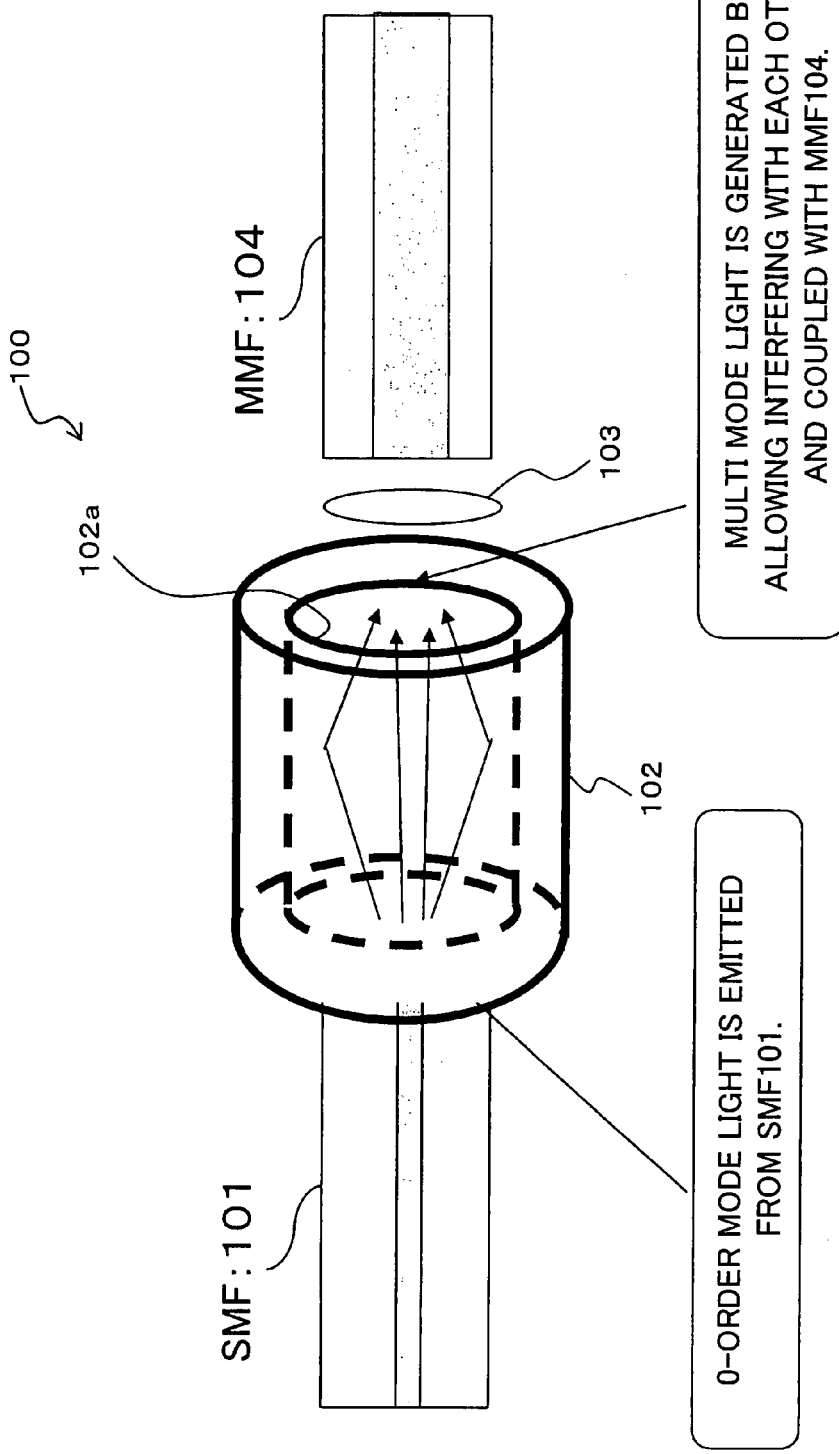

DISPERSION COMPENSATION DEVICE

BACKGROUND OF THE INVENTION

1. Field of the Invention

The present invention relates to a dispersion compensation device, which is suitably used for compensating chromatic dispersion in an optical communication system.

2. Description of the Related Art

Our society has reached a stage, so called, an information society. Optical fiber communication system, which is capable of transmitting a large volume and a variety of information at a high speed, is evaluated as an essential system indispensable for our lives. Generally, the optical fiber communication system includes a signal source for generating optical signals, an optical fiber transmission line for transmitting the optical signals and an optical receiver for detecting and demodulating the optical signals.

In this optical fiber communication system, when optical signals within a specific wavelength range are transmitted through an optical fiber having positive chromatic dispersion, a delay is generated because the propagation velocity of optical signals with longer wavelength components is lower than that of optical signals with shorter wavelength components. The waveform of the optical signals deteriorates due to the delay. Particularly, in the case where a number of channels are transmitted in a wide wavelength range, a chromatic dispersion compensation that precisely compensates such differences in propagation velocity (chromatic dispersion) is required. In particular, in a DWDM (Dense Wavelength Division Multiplexing) communication system, compensation of chromatic dispersion as described above; i.e., dispersion slope compensation is indispensable.

Conventionally, a dispersion compensation fiber (DCF) is used for the purpose of the dispersion compensation. However, the DCF is expensive and compensates only a fixed compensation amount.

Also, the following small dispersion compensation device has been proposed as shown in FIG. 8 (for example, refer to patent document 1). That is, the light propagating through a single mode fiber (SMF) is converted into the light of higher mode, and allowed to propagate through a multi-mode fiber (MMF), thereby dispersion compensation is carried out.

In a dispersion compensation device 100 shown in FIG. 8, it is arranged so that a beam of 0th mode light, which propagates through a single mode fiber 101, is allowed to pass through a cylindrical member 102 of which inside surface is formed of a total reflection member 102a to generate interference with each other; and thereby, the 0th mode light is converted into a multi-mode light, and the converted multi-mode light is allowed to propagate through a multi-mode fiber 104 via a lens 103. That is, it is arranged so that, by utilizing such a characteristic of the multi-mode fiber 104 itself that the dispersion slope characteristic varies depending on the status of mode of the multi-mode light, the chromatic dispersion of the light propagating through the single mode fiber 101 is compensated.

[Patent document 1] Published Japanese translation of PCT international application, No. 2002-507778

However, the conventional DCF as described above has such a configuration that the dispersion compensation amount is controlled based on the length of the optical fiber. Accordingly, the dispersion characteristics, which are compensated by one DCF, are fixedly determined. Therefore, in the case where the dispersion amount changes as time passes, dispersion compensation following the changes is hardly carried out. Therefore, dispersion compensation corresponding to a high-speed transmission is hardly achieved. Also, when it is intended to carry out the dispersion compensation of an optical transmission path by means of the DCF, dispersion compensation fibers of a length, which corresponds to each of the optical fibers employed as the optical transmission paths respectively, have to be formed corresponding to each of the optical transmission paths. Thus, there also resides a problem to be improved in an aspect of cost.

In the above-described dispersion compensation device 100 shown in FIG. 8 also, same as the case of the DCF, since the status of mode of the multi-mode light to be converted depends on the length of the cylindrical member 102, the dispersion compensation devices 100 having a compensation amount respectively corresponding to each of the optical fibers employed as the optical transmission paths have to be designed. Therefore, dispersion compensation corresponding to a high-speed transmission is hardly carried out. There also resides a problem to be improved in an aspect of cost.

Therefore, to cope with the above-described situation, it is preferred to employ a variable dispersion compensation device capable of changing the compensation amount corresponding to the length of the optical transmission path and/or transmission speed.

SUMMARY OF THE INVENTION

In view of the above-described problem, the present invention has been proposed. An object of the present invention is to provide a dispersion compensation device capable of changing the dispersion compensation amount using a simple configuration.

In order to achieve the above object, a dispersion compensation device according to the present invention includes a first mode light conversion section capable of converting input light into light of higher mode, a dispersion compensation section capable of, with respect to the light of higher mode outputted from the first mode light conversion section, compensating a chromatic dispersion corresponding to the status of mode of the light of higher mode, a second mode light conversion section capable of, with respect to the light of higher mode dispersion-compensated in the dispersion compensation section, converting into light of original mode, and a mode control section capable of variably controlling the status of mode of the light of higher mode converted in the first mode light conversion section, and controlling to convert the light of higher mode from the dispersion compensation section to the light of original mode in the second mode light conversion section.

Also, the mode control section may be configured so as to control to vary the status of mode of the light of higher mode converted by the first mode light conversion section corresponding to the dispersion amount of the light outputted from the second mode light conversion section.

Further, the first mode light conversion section may be configured so as to convert the light of basic mode outputted from the single mode fiber at the input side into the light of higher mode, and the second mode light conversion section may be configured so as to convert the light of higher mode dispersion-compensated in the dispersion compensation section into the light of basic mode and output the same to the single mode fiber at the output side.

Further, the above-described dispersion compensation device may include a first collimate lens interposed between the single mode fiber at the input side and the first mode light conversion section, a second collimate lens interposed between the first mode light conversion section and the dispersion compensation section, a third collimate lens interposed between the dispersion compensation section and the second mode light conversion section, and a fourth collimate lens interposed between the second mode light conversion section and the single mode fiber at the output side.

Further, each of the first and second mode light conversion sections may be comprised of an axicon lens capable of varying the status of mode of output light with respect to the input light based on the relative distance with respect to the dispersion compensation section, and the mode control section may be comprised of a first relative distance variable section capable of variably setting relative distance of the axicon lens as the first mode light conversion section with respect to the dispersion compensation section, a second relative distance variable section capable of variably setting relative distance with respect to the dispersion compensation section of the axicon lens as the second mode light conversion section, a monitor section for monitoring the light from the second mode light conversion section, and a relative-distance setting control unit for controlling the first and second relative distance variable sections in order to set and control the relative distances with respect to the dispersion compensation section of the axicon lenses as the first and second mode light conversion sections based on the monitor result in the monitor section.

Further, each of the first and second mode light conversion sections may be comprised of a thermal lens capable of varying the status of mode of the output signal light with respect to the input signal light based on the intensity of control light inputted along with input signal light, and the mode control section may be comprised of a control light source that emits control light for varying the status of mode of the thermal lens as the first and second mode light conversion sections, a monitor section that monitors the light outputted from the second mode light conversion section, and a control light source control section that controls the control light source to set and control the changes in refractive index of thermal lenses as the first and second mode light conversion sections based on the monitor result in the monitor section.

Further, the dispersion compensation section may be preferably comprised of a multi-mode fiber. Furthermore, the multi-mode fiber may be configured so as to be inputted with the light of higher mode from the first mode light conversion section from one end thereof and to output the dispersion-compensated light from the other end opposite to the one end, and the first mode light conversion section, the multi-mode fiber and the second mode light conversion section are disposed in one direction in the order.

Also, the multi-mode fiber may be configured with, at the other end opposite to one end to which the light of higher mode is inputted from the first mode light conversion section, a reflection member for reflecting the light propagating through the multi-mode fiber to output the dispersion-compensated light from the one end to which the light of higher mode is inputted, and the first and second mode light conversion sections may be commonly used as reversible members.

As described above, according to the present invention, the mode control section variably controls the status of mode of the light of higher mode converted in the first mode light conversion section, and controls to convert the light of higher mode from the dispersion compensation section to the light of original mode in the second mode light conversion section. Thereby, the conversion efficiency to a higher mode can be varied and the dispersion compensation amount by the dispersion compensation section can be varied. Accordingly, an advantage such that the dispersion compensation amount can be varied using a simple configuration is obtained.

BRIEF DESCRIPTION OF THE DRAWINGS

FIG. 6(A) to FIG. 6(C) are diagrams each for illustrating the function by a thermal lens in the second embodiment;

FIG. 8 is a diagram showing a conventional art.

DESCRIPTION OF THE PREFERRED EMBODIMENTS

Figure 1:
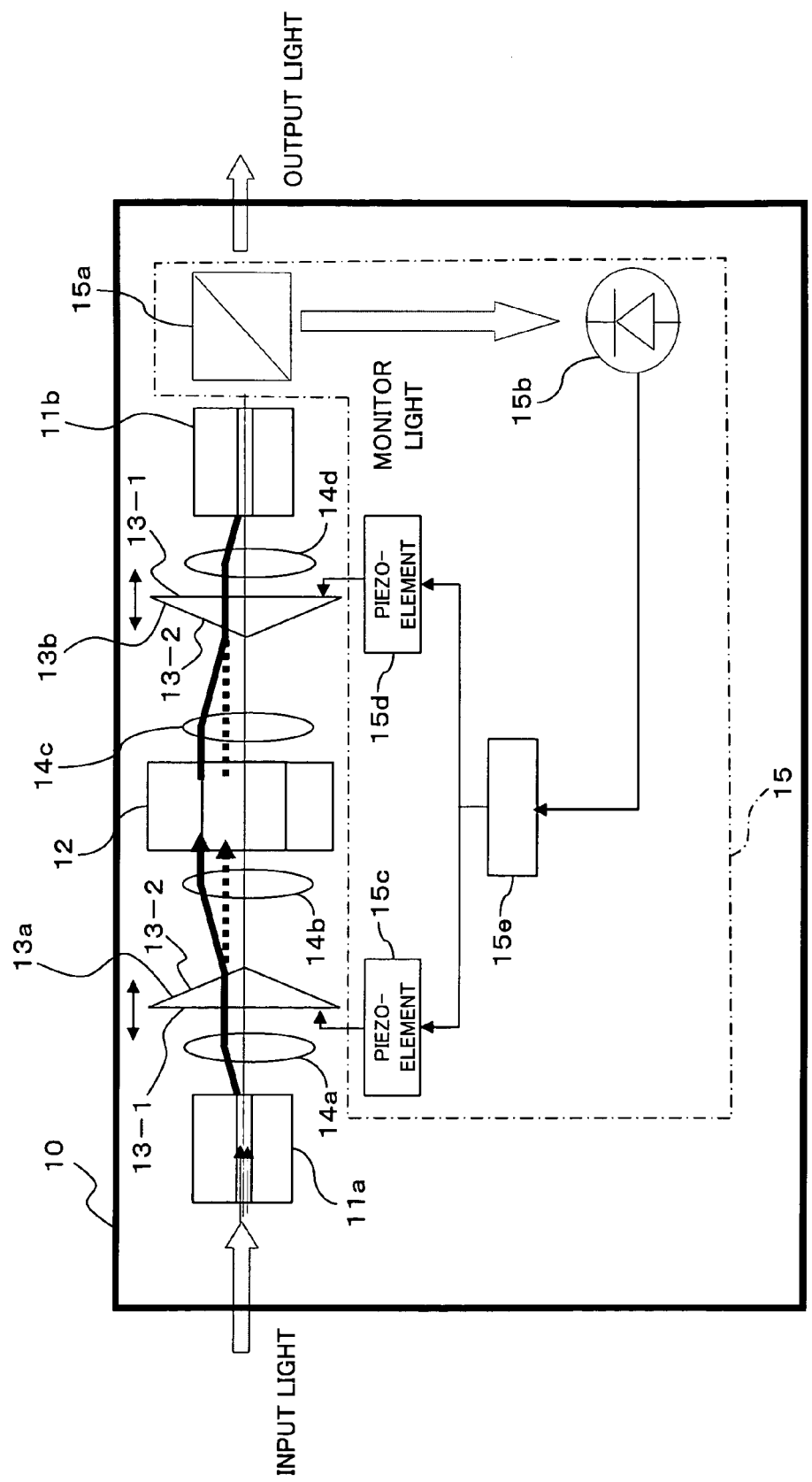
FIG. 1 is a diagram showing a dispersion compensation device according to a first embodiment of the present invention.

Hereinafter, referring to the drawings, embodiments of the present invention will be described.

A1 Description of First Embodiment

FIG. 1 is a diagram showing a dispersion compensation device according to a first embodiment of the present invention. A dispersion compensation device 10 shown in FIG. 1 is provided to a relay station and/or a receiving terminal and the like in an optical communication system, and is capable of compensating chromatic dispersion with respect to wavelength-division multiplexed light, which reaches after propagating through a transmission fiber.

The dispersion compensation device 10 shown in FIG. 1 includes single mode fibers (SMF) 11a and 11b, a multi-mode fiber (MMF) 12, axicon lenses 13a and 13b, first to fourth collimate lenses 14a to 14d and a mode control section 15. From the viewpoint of optics, the single mode fiber 11a, the collimate lens 14a, the axicon lens 13a, the collimate lens 14b, the multi-mode fiber 12, the collimate lens 14c, the axicon lens 13b, the collimate lens 14d, the single mode fiber 11b and a light branching element 15a constituting the mode control section 15 are connected to each other in that order in one direction.

Here, it is arranged so that, when a beam of input light of 0th mode (basic mode) as optical signals, which is inputted to the single mode fiber 11a at the input side, is outputted from the output end, the light is condensed by the first collimate lens 14a and inputted to the axicon lens 13a. The first collimate lens 14a is interposed on the light path between the single mode fiber at the input side 11a and the axicon lens 13a.

Figure 2:
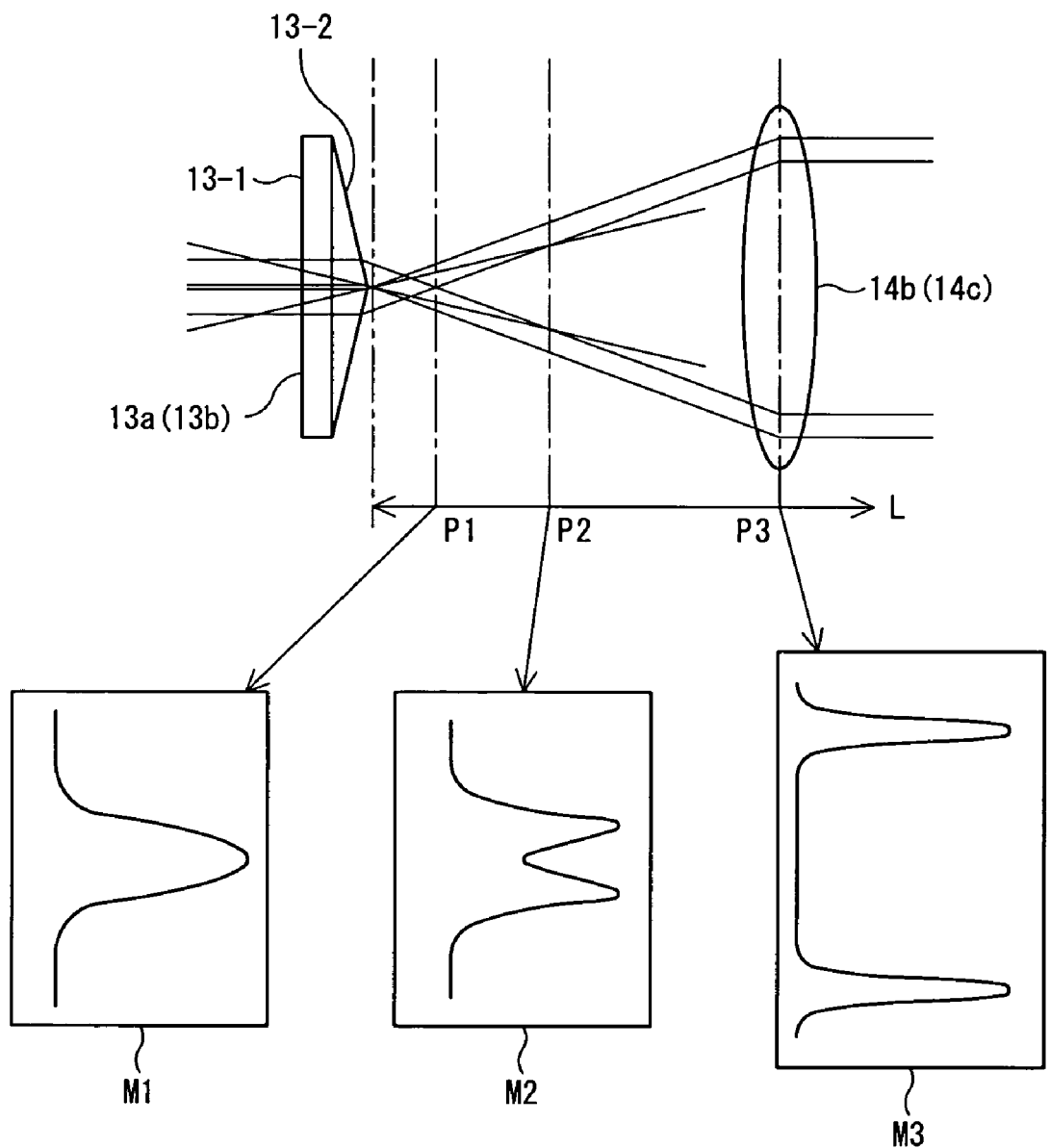
FIG. 2 is a diagram for illustrating a function of an axicon lens in the first embodiment.

As shown in FIG. 2, each of the axicon lenses 13a and 13b is a lens formed with a plane portion 13-1 at one side and a conical-shaped surface portion 13-2 having a vertex at the center thereof on the other side. Based on the relative distance with respect to the multi-mode fiber 12, which will be described later, the lenses 13*a* and 13*b* are capable of varying the status of mode of the output light with respect to the input light.

The axicon lens 13*a* is adapted so that, when a Gaussian beam is inputted at the central area in the plane portion 13-1, the light outputted from the conical-shaped surface portion 13-2 as the output plane expands in a doughnut-like shape. The axicon lens 13*b* is adapted so that, when the light expanded in a doughnut-like shape is condensed and inputted at the vertex portion of the conical-shaped surface portion 13-2, a Gaussian beam is outputted from the plane portion 13-1.

Also, it is adapted so that, as shown in FIG. 2, for example, when a Gaussian beam is inputted to the central area of the plane portion 13-1, the light outputted from the conical-shaped surface portion 13-2 changes its optical power distribution M1, M2, M3; i.e., the order of mode of the output light changes depending on the position P1, P2, P3. In FIG. 1, the mode control section 15, which will be described later, variably controls the distance L (refer to FIG. 2) between the axicon lens 13*a* and the second collimate lens 14*b* provided at the output side. Accordingly, it is arranged so that multi-mode light, of which order of mode with respect to the 0th mode light inputted to the first collimate lens 14*a* is variably controlled, is outputted from the second collimate lens 14*b*.

Thus, the above-described axicon lens 13*a* constitutes a first mode light conversion section capable of converting the inputted light to the light of a higher mode. The second collimate lens 14*b* is interposed on the light path between the axicon lens 13*a* and the multi-mode fiber 12.

Figure 3:
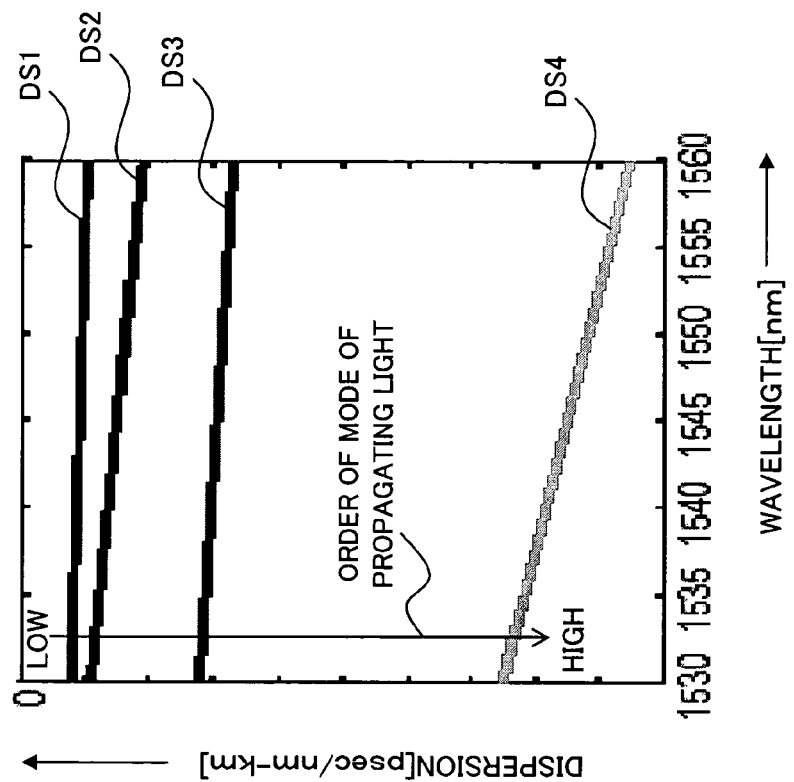
FIG. 3 is a diagram showing dispersion slope characteristics corresponding to the status of mode by the multi-mode fiber in the first embodiment.

The multi-mode fiber 12 allows the multi-mode light from the second collimate lens 14*b* to propagate and outputs the light to the third collimate lens 14*c*. The multi-mode fiber 12 has, for example, as shown in FIG. 3, a characteristic such that the dispersion slope characteristic becomes more striking as the order of mode of the propagating light becomes higher.

That is, due to the distance between the axicon lens 13*a* and the second collimate lens 14*b*, which is variably controlled, the order of mode of the light inputted to the multi-mode fiber 12 is variably controlled. It is adapted so that, in the multi-mode fiber 12, the dispersion compensation is made on the inputted light based on the dispersion slope characteristic in accordance with the variably controlled order of mode.

Accordingly, the multi-mode fiber 12 functions as a dispersion compensation section which, in cooperation with the second and the third collimate lenses 14*b* and 14*c*, is capable of performing the dispersion compensation on the higher mode light inputted from the axicon lens 13*a* based on the dispersion slope characteristic corresponding to the status of mode of the higher mode light.

The third collimate lens 14*c* is interposed on the light path between the multi-mode fiber 12 and the axicon lens 13*b*. The third collimate lens 14*c* condenses the multi-mode light outputted from the multi-mode fiber 12 to the vertex portion of the conical-shaped surface portion 13-2 on the axicon lens 13*b*. Further, in order to cause the axicon lens 13*b* to function as a reversible element of the above-described axicon lens 13*a*, the mode control section 15 variably controls the distance from the third collimate lens 14*c* so as to allow the multi-mode light from the third collimate lens 14*c* to be inputted at the vertex portion of the conical-shaped surface portion 13-2 and to output the light as the 0th mode light from the plane portion 13-1.

Thus, the axicon lens 13*b* constitutes a second mode light conversion section, which is capable of converting the higher mode light, which has been dispersion-compensated by the multi-mode fiber 12 and inputted through the third collimate lens 14*c*, to the light of original mode (in this case, 0th mode light).

The fourth collimate lens 14*d* is interposed on the light path between the axicon lens 13*b* and the single mode fiber 11*b* at the output side. The fourth collimate lens 14*d* condenses the 0th mode light outputted from the plane portion 13-1 of the axicon lens 13*b* and outputs the light to the next single mode fiber 11*b*. Thus, the 0th mode light dispersion-compensated by the multi-mode fiber 12 is outputted as the output light through the single mode fiber at the output side 11*b*.

The mode control section 15 is capable of variably controlling the status of mode of the higher mode light converted by the axicon lens 13*a* and the collimate lens 14*b*. Also, the mode control section 15 controls to convert the higher mode light from the multi-mode fiber 12 to the original 0th mode light with the collimate lens 14*c* and the axicon lens 13*b*. Particularly, the status of mode of the higher mode light converted by the axicon lens 13*a* is controlled so as to vary corresponding to the dispersion amount of the light outputted from the axicon lens 13*b*.

The mode control section 15 includes the light branching element 15*a* for branching a part of the 0th mode light, which has been dispersion-compensated, from the single mode fiber 11*b* at the output side for monitoring, a photo acceptance unit 15*b* that receives a part of the 0th mode light, which is branched by the light branching element 15 for monitoring, piezo-elements 15*c* and 15*d* and a relative-distance setting control unit 15*e*. The light branching element 15*a* and the photo acceptance unit 15*b* constitute a monitor section for monitoring the light outputted from the axicon lens 13*b*.

Further, the piezo-elements 15*c* and 15*d* are capable of variably setting the position of the axicon lenses 13*a* and 13*b* in the forward/backward direction on each of the light paths. That is, the piezo-element 15*c* is provided as a first relative distance variable section capable of variably setting the relative distance with respect to the second collimate lens 14*b* constituting the dispersion compensation section of the axicon lens 13*a*. The piezo-element 15*d* is provided as a second relative distance variable section capable of variably setting the relative distance with respect to the third collimate lens 14*c* constituting the dispersion compensation section of the axicon lens 13*b*.

The relative-distance setting control unit 15*e* controls the piezo-elements 15*c* and 15*d* to set and control the relative distance with respect to the second and third collimate lenses 14*b* and 14*c* constituting the dispersion compensation section of the axicon lenses 13*a* and 13*b* based on the monitoring result by the photo acceptance unit 15*b*.

In particular, the relative-distance setting control unit 15*e* monitors the dispersion amount of the output light based on the electric signals from the photo acceptance unit 15*b* and controls the piezo-element 15*c* corresponding to the monitoring result. That is, by controlling the piezo-element 15*c* to vary the relative position between the axicon lens 13*a* and the collimate lens 14*b*, the status of mode of the multi-mode light induced by the axicon lens 13*a* is set up. Thus, it is arranged so that optimal dispersion compensation is obtained by the multi-mode fiber 12; i.e., chromatic dispersion of the output light is kept to minimum.

FIG. 3 shows dispersion slope characteristics DS1 to DS4 of the multi-mode fiber 12 corresponding to the four different statuses of mode. According to the present invention, the piezo-element 15c variably controls the position of the axicon lens 13a on the light path in the forward/backward direction not in a step manner but in a continuous manner. Accordingly, the dispersion slope characteristic of the multi-mode fiber 12 can be changed continuously, for example, from a status of the dispersion slope characteristic DS1 shown in FIG. 3 to a status of the dispersion slope characteristic DS4.

Further the relative-distance setting control unit 15e is adapted to control the piezo-element 15d so as to set and control the position of the axicon lens 13b on the light path in the forward/backward direction. In particular, it is adapted so that the distance of the light path between the axicon lens 13b and the collimate lens 14c is equal to the distance of the light path between the axicon lens 13a and the collimate lens 14b, which is set up to induce the multi-mode light. Owing to this, the multi-mode light which is converted by the axicon lens 13a can be easily returned to the 0th mode light.

Using the above-described configuration, in the dispersion compensation device 10 according to the first embodiment of the present invention, based on the fact that the higher mode light has a larger dispersion slope in the multi-mode fiber 12, a higher mode light is induced by the axicon lens 13a, and is allowed to pass through the multi-mode fiber 12 to carry out the dispersion compensation. Here, by controlling the position of the axicon lens 13a with the mode control section 15, the conversion efficiency to the higher mode is varied to change the dispersion compensation amount.

As described above, in the dispersion compensation device 10 according to the first embodiment of the present invention, the mode control section 15 controls the position of the axicon lens 13a to vary the conversion efficiency to a higher mode; thus the dispersion compensation amount by the multi-mode fiber 12 is varied. Such advantage that the dispersion compensation amount can be varied using a simple configuration is obtained.

A2 Description of a Modification of the First Embodiment

Figure 4:
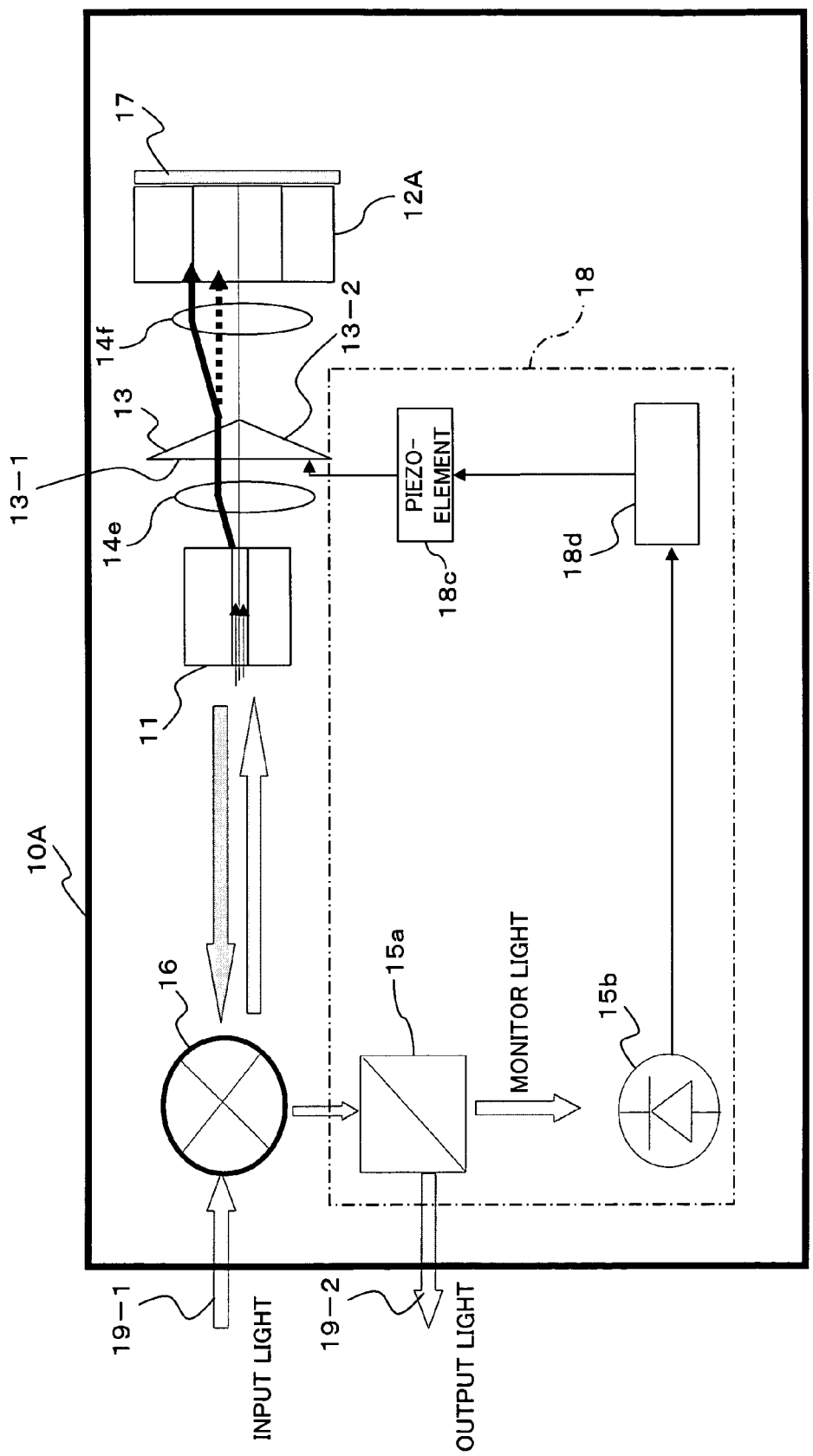
FIG. 4 is a diagram showing a dispersion compensation device according to a modification of the first embodiment.

FIG. 4 is a diagram showing a dispersion compensation device 10A according to a modification of the first embodiment of the present invention. The dispersion compensation device 10A shown in FIG. 4 is different from the first embodiment in the following point. That is, a total reflection mirror 17 is formed at one end of a multi-mode fiber 12A. Thereby, the dispersion compensation device 10A is adapted to output the output light in which chromatic dispersion is compensated through a reflection light path in the direction opposite to the input light path. The dispersion compensation device 10A shown in FIG. 4 includes a single mode fiber (SMF) 11, the multi-mode fiber (MMF) 12A formed with the total reflection mirror 17 at one end thereof, an axicon lens 13 and collimate lenses 14e and 14f constituting reversible members, an optical circulator 16 and a mode control section 18.

In the dispersion compensation device 10A shown in FIG. 4, including the total reflection mirror 17 as the reflection plane, the single mode fiber 11, the collimate lens 14e, the axicon lens 13, the collimate lens 14f and the multi-mode fiber 12A are optically connected in both directions.

The optical circulator 16 is adapted so as to output the input light from the input port 19-1, of which chromatic dispersion should be compensated, to the single mode fiber 11 side; and to output the light from the single mode fiber 11 side as the output light from the output port 19-2 via the light branching element 15a constituting the mode control section 18, which will be described later.

The single mode fiber 11 has both of the inputting and outputting functions that the single mode fibers 11a and 11b have in the dispersion compensation device 10 shown in FIG. 1. The collimate lens 14e has both functions that the collimate lenses 14a and 14d have in the dispersion compensation device 10. The axicon lens 13 has both functions that the axicon lenses 13a and 13b have in the dispersion compensation device 10 shown in FIG. 1. And further, the collimate lens 14f has both functions that the collimate lenses 14b and 14c have in the dispersion compensation device 10 shown in FIG. 1. That is, it is arranged so that the input light of the 0th mode light from the collimate lens 14c is converted into multi-mode light and outputted to the multi-mode fiber 12A through the collimate lens 14f. On the other hand, the multi-mode light from the collimate lens 14f is converted into original 0th mode light and outputted to the single mode fiber 11 through the collimate lens 14e.

The mode control section 18 has substantially the same function as that of the above-described mode control section shown in FIG. 1 (refer to reference numeral 15). However, the mode control section 18 is different from the mode control section 15 shown in FIG. 1 in the following point; i.e., a single piezo-element 18c has both functions that the piezo-elements 15c and 15d shown FIG. 1 have. In FIG. 4, the same reference numerals as those used in FIG. 1 denote substantially the same component parts.

The relative-distance setting control unit 18d controls the piezo-element 18c so as to optimally compensate the chromatic dispersion based on the status of the chromatic dispersion of the output light as the monitoring result from the photo acceptance unit 15b. That is, by setting the distance between the axicon lens 13 and the collimate lens 14f with the piezo-element 18c, the order of mode of the multi-mode light to be converted by the axicon lens 13 is set up. By controlling the piezo-element 18c, it is set up so that the reflected light is converted into original 0th mode light.

Owing to the above-described configuration, in the dispersion compensation device 10A shown in FIG. 4, the 0th mode light as the input light from the optical circulator 16 is converted into multi-mode light by the axicon lens 13 through the single mode fiber 11 and the collimate lens 14e and inputted to the multi-mode fiber 12A through the collimate lens 14f. Here, the mode control section 18 monitors the compensation level of the chromatic dispersion from the output light from the optical circulator 16, and by controlling the piezo-element 18c, the distance of the axicon lens 13 with respect to the multi-mode fiber 12A is set up so that the chromatic dispersion can be optimally compensated.

The multi-mode fiber 12A reflects the multi-mode light inputted from the collimate lens 14f with the total reflection mirror 17 formed at one end opposite to the input side of the multi-mode light, and the multi-mode light is outputted to the collimate lens 14f through the reflection light path in the direction opposite to the input light path. Here, same as the case of the above-described multi-mode fiber 12, the dispersion compensation is made based on the dispersion slope characteristic depending on the status of mode of the multi-mode light converted by the axicon lens 13.

The multi-mode light (chromatic dispersion has been compensated), which has been reflected by the total reflection mirror 17 and outputted from the multi-mode fiber 12A, is inputted to the conical-shaped surface portion 13-2 of the axicon lens 13 through the collimate lens 14f. Since the axicon lens 13 is formed as a reversible member, the multi-mode light is outputted as the 0th mode light in which the chromatic dispersion has been compensated, and outputted therefrom as the output light through the collimate lens 14e, the single mode fiber 11 and the optical circulator 16.

As described above, in the dispersion compensation device 10A according to the modification of the first embodiment of the present invention, in addition to the same advantage as that in the first embodiment, since the total reflection mirror 17 is formed at one end of the multi-mode fiber 12A, the following advantages are also obtained. That is, compared to the dispersion compensation device 10 (refer to FIG. 1) in the first embodiment, the number of component parts such as collimate lens, axicon lens or piezo-element can be reduced. Thus the space required for the light path can be largely reduced resulting in a compaction of the package as the dispersion compensation device.

B1 Description of Second Embodiment

Figure 5:
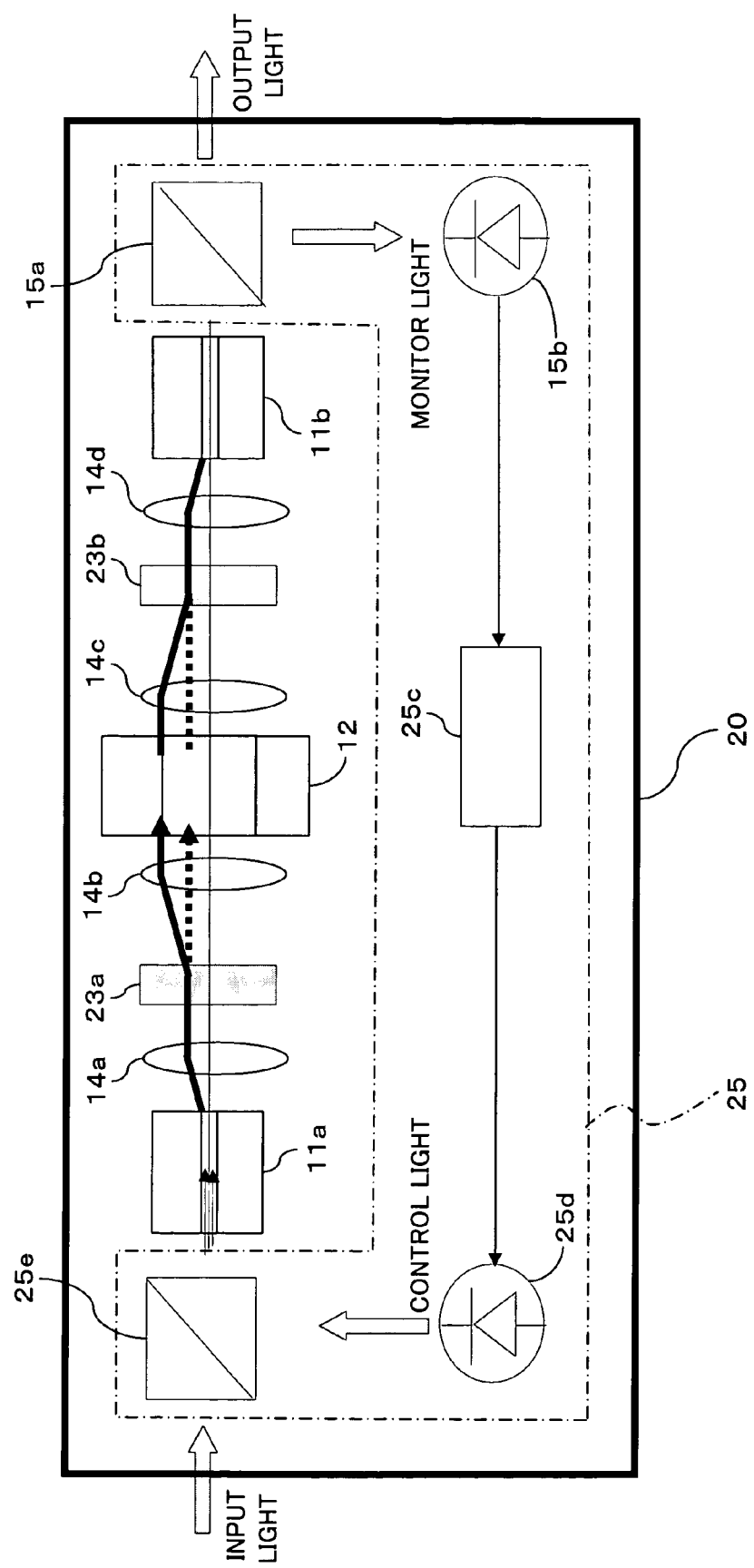
FIG. 5 is a diagram showing a dispersion compensation device according to a second embodiment of the present invention.

FIG. 5 shows a dispersion compensation device 20 according to a second embodiment of the present invention. The dispersion compensation device 20 shown in FIG. 5 is different from the above-described dispersion compensation device according to the first embodiment (refer to reference numeral 10 in FIG. 1) in the following points. That is, at the positions where the axicon lenses 13a and 13b as the first and second mode light conversion sections are provided, thermal lenses 23a and 23b are disposed as the first and second mode light conversion sections, and a thermal lens control section 25 for controlling the thermal lenses 23a and 23b is provided. The configuration other than the above is basically the same as the dispersion compensation device 10 according to the first embodiment. In FIG. 5 and FIG. 6, the same reference numerals as those used in FIG. 1 denote substantially the same component parts.

Here, the thermal lenses 23a and 23b are light propagative members including a thin film (thermal lens forming layer), in which pigment capable of absorbing laser beam with a specific wavelength (for example, wavelength of approximately 630 nm) as a control light is dispersed in a polymer. In a status where the control light is not inputted, the thermal lenses 23a and 23b allow the signal light to propagate linearly as it is. On the other hand, in a satus where the control signal is inputted, the refractive index of an area adjacent to the thin film molecules changes due to the photothermal conversion. As a result, such changes as if the signal light passes through a concave lens are resulted in the refractive index.

Since the effect of the photothermal conversion becomes larger as the optical power of the control light becomes stronger, it is adapted so that the changes in the refractive index appear largely. FIG. 6(A) to FIG. 6(C) are diagrams for illustrating the fact that, from the viewpoint of the thickness of the signal light beam at the thermal lens 23a, the changes in the refractive index of the thermal lens 23a become larger as the power of the control light changes.

That is, as shown in FIG. 6(A), in the status where the control light is not inputted, signal light S1 (0th mode light) inputted to the thermal lens 23a propagates linearly as it is and is outputted therefrom. Intensity distribution of the signal light outputted from the collimate lens 14b becomes, for example, as M1.

As shown in FIG. 6(B), when control light C1 having a relatively weak optical power is inputted to the entrance plane of the thermal lens 23a along with signal light S2, and in a spot area where the light is converged, the refractive index decreases concentrically. The thermal lens 23a causes relatively small changes in the refractive index like a concave lens. Accordingly, the signal light S2 is expanded in beam thickness along with the control light C1 and outputted therefrom. Here, the intensity distribution of the signal light outputted from the collimate lens 14b appears, for example, as M2.

Further, as shown in FIG. 6(C), when the control light C2, which has a relatively strong optical power, is inputted to the entrance plane of the thermal lens 23a along with the signal light S3, the thermal lens 23a causes relatively large changes in the refractive index like a concave lens. Accordingly, the signal light S3 is expanded in the beam thickness along with the control light C2 and outputted therefrom. Here, the intensity distribution of the signal light outputted from the collimate lens 14b appears, for example, as M3 resulting in a beam configuration having a doughnut-like shape.

Thus, in the thermal lenses 23a and 23b, when the intensity of the light is changed, the intensity distribution of the signal light outputted from the collimate lens 14b changes as M1, M2 and M3. Accordingly, the order of mode of the output light with respect to the input light can be changed. That is, the thermal lens 23a constitutes a first mode light conversion section, which is capable of converting the inputted light into the light of higher mode.

In the thermal lens 23b, multi-mode light, which has a beam configuration at the output side in FIG. 6(A) to FIG. 6(C), is inputted through the multi-mode fiber 12, and is converted into the signal light of original 0th mode in accordance with the optical power of each control light. Accordingly, the thermal lens 23b constitutes a second mode light conversion section, which is capable of converting the light of higher mode dispersion-compensated by the multi-mode fiber 12 into the original mode light.

The mode control section 25 is capable of variably controlling the status of the mode of the higher mode light to be converted by the thermal lens 23a. Also, the mode control section 25 converts the light of higher mode from the multi-mode fiber 12 into the original 0th mode light with the thermal lens 23b. Accordingly, the mode control section 25 is capable of variably controlling the control light intensity supplied along with the input signal light. In addition to a light branching element 15a and a photo acceptance unit 15b same as the mode control section 15 in the above-described first embodiment, the mode control section 25 includes, a control light source control section 25c, a control light source 25d, and a control light combining element 25e. The light branching element 15a and the photo acceptance unit 15b constitute a monitor section for monitoring the light outputted from the thermal lens 23b.

The control light source 25d is capable of outputting control light having a waveband (for example, waveband of 630 nm) other than the wavelength used for the signal light at an optical power based on the control by the control light source control section 25c, which will be described later. It is adapted so that the control light outputted by the control light source 25d is outputted to the control light combining element 25e provided in the previous state of the single mode fiber 11a at the input side, and is combined with the input signal light by the control light combining element 25e.

The control light source control section 25c controls the control light source 25d so as to set and control the control light intensity to be supplied to the thermal lenses 23a and 23b based on the monitoring result by the photo acceptance unit 15b.

In particular, the control light source control section 25c monitors the dispersion amount of the output light based on the electric signals from the photo acceptance unit 15b, and determines the control light intensity at the control light source 25d corresponding to the monitoring result. That is, by supplying the control light to the thermal lenses 23a and 23b at a determined control light intensity, the status of mode of the multi-mode light outputted to the thermal lens 23a is set up. Owing to this, based on the monitoring result of the compensation level of chromatic dispersion, the conversion efficiency to the higher mode is varied; and thus, the dispersion compensation amount is varied.

That is, same as the above-described axicon lens 13a in FIG. 1, the mode control section 25 controls so that the optimal dispersion compensation is obtained by the multi-mode fiber 12; i.e., the chromatic dispersion of the output light is minimum.

The control light combined by the control light combining element 25e is supplied to both of the thermal lens 23a and thermal lens 23b. That is, it is adapted so that the dispersion-compensated multi-mode light from the multi-mode fiber 12 is inputted to the thermal lens 23b, which receives the control light, in accordance with the control light intensity through the collimate lens 14c, and the multi-mode light is converted to the original 0th mode light and outputted therefrom. Owing to this, the multi-mode light, which has been converted by the thermal lens 23a, can be easily returned to the 0th mode light.

Components other than the component of the signal light such as component of control light and the like in the light outputted from the single mode fiber 11b can be removed by using an appropriate optical filter and the like.

Owing to the above-described configuration, same as the dispersion compensation device 10 according to the first embodiment, the dispersion compensation device 20 according to the second embodiment of the present invention also utilizes the fact that the dispersion slope at the higher mode is large in the multi-mode fiber 12. The dispersion compensation device 20 induces a higher mode light with the thermal lens 23a, and allows the higher mode light to pass through the multi-mode fiber 12 to carry out the dispersion compensation. Here, by controlling the intensity of the control light with the mode control section 25, the conversion efficiency to the higher mode is varied to change the dispersion compensation amount.

As described above, the dispersion compensation device 20 according the second embodiment of the present invention has the following advantage. That is, in such a simple configuration, using the mode control section 25, the refractive index of the thermal lenses 23a and 23b is controlled to vary the conversion efficiency to the higher mode, and the dispersion compensation amount with the multi-mode fiber 12 is changed; and thus, the dispersion compensation amount can be varied.

B2 Description of a Modification of the Second Embodiment

Figure 7:
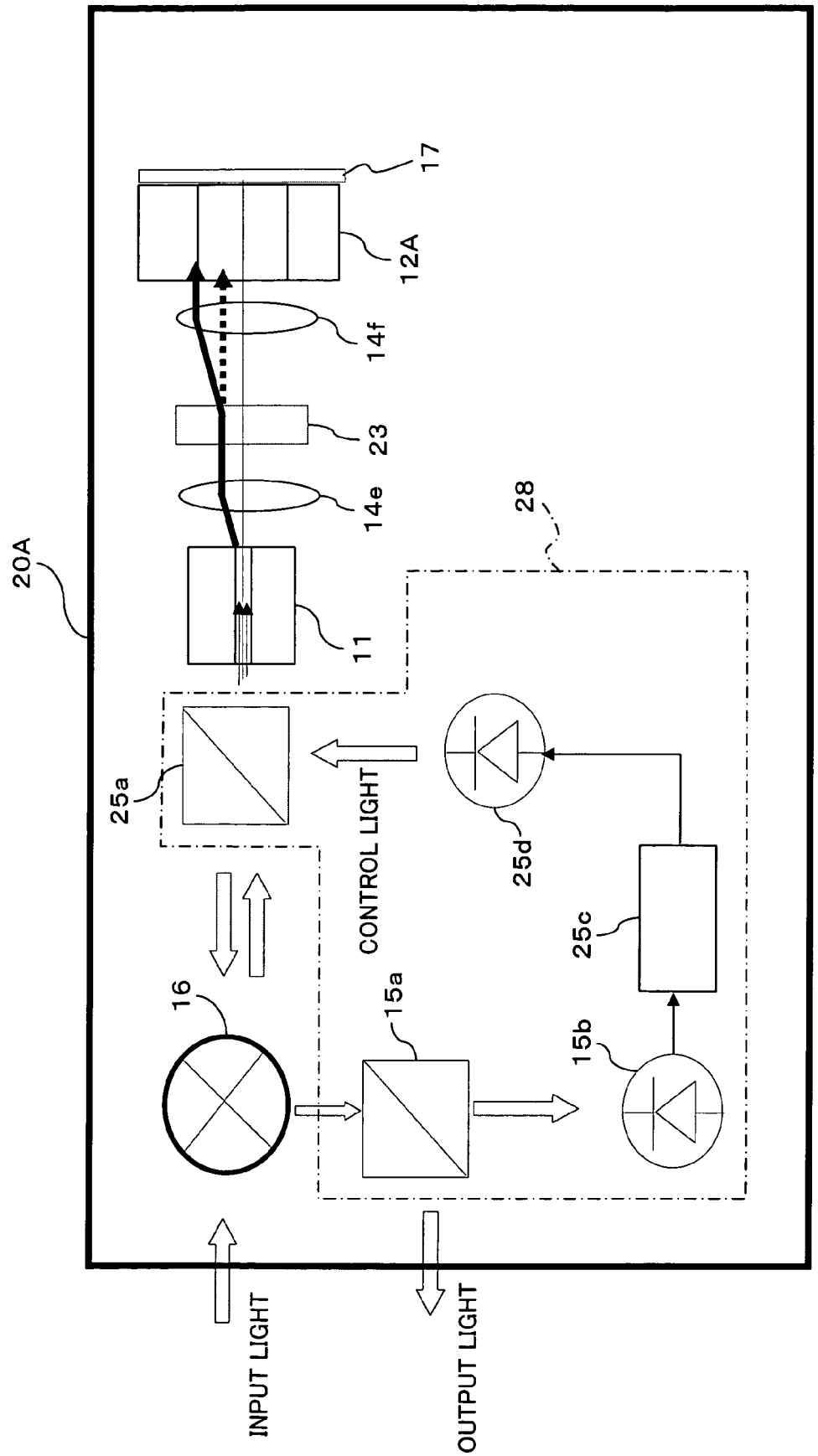
FIG. 7 is a diagram showing a dispersion compensation device according to a modification of the second embodiment.

FIG. 7 shows a dispersion compensation device 20A according to the modification of the second embodiment of the present invention. The dispersion compensation device 20A shown in FIG. 7 has a configuration of reflection type similar to the dispersion compensation device 10A shown in FIG. 4 with respect to the above-described dispersion compensation device 20 shown in FIG. 5, which uses the thermal lenses.

The dispersion compensation device 20A is different from the dispersion compensation device 20 in the following point. That is, in the dispersion compensation device 20A, a total reflection mirror 17 is formed at one end of the multi-mode fiber 12A; and it is adapted so that the output light of which chromatic dispersion has been compensated is outputted through the reflection light path in the direction opposite to the input light path. The dispersion compensation device 20A shown in FIG. 7 includes a single mode fiber (SMF) 11, a multi-mode fiber (MMF) 12A formed with a total reflection mirror 17 at one end thereof, a thermal lens 23 constituting a reversible member, collimate lenses 14e and 14f, an optical circulator 16 and a mode control section 28. In FIG. 7, the same reference numerals as those used in FIG. 4 denote substantially the same component parts.

Here, the thermal lens 23 has both functions that the thermal lenses 23a and 23b have in the dispersion compensation device 20 shown in FIG. 5. It is adapted so that, based on the control light from the mode control section 28, which will be described later, the input light of the 0th mode light from the collimate lens 14e is converted to the multi-mode light and outputted to the multi-mode fiber 12A through the collimate lens 14f; on the other hand, the multi-mode light from the collimate lens 14f is converted into original 0th mode light and outputted to the single mode fiber 11 through the collimate lens 14e.

The mode control section 28 has substantially the same function as that of the above-described mode control section (refer to reference numeral 25) shown in FIG. 5. The mode control section 28 includes a light branching element 15a that branches a part of signal light outputted from the optical circulator 16 for the purpose of monitoring, a photo acceptance unit 15b, a control light source control section 25c, a control light source 25d and a control light combining element 25e interposed between the optical circulator 16 and the single mode fiber 11. In FIG. 7, the same reference numerals as those used in FIG. 5 denote substantially the same component parts.

Components other than the components of the signal light such as components of control light in the light outputted from the optical circulator 16 can be removed by appropriately using an optical filter and the like.

Owing to the above-described configuration, in the dispersion compensation device 20A shown in FIG. 7, the 0th mode light as the input light from the optical circulator 16 is converted into the multi-mode light by the thermal lens 23 through the single mode fiber 11 and the collimate lens 14e and inputted to the multi-mode fiber 12A through the collimate lens 14f. At this time, the mode control section 28 monitors the compensation level of the chromatic dispersion using the output light from the optical circulator 16 and supplies the control light with the intensity, which has been adjusted so that the chromatic dispersion can be optimally compensated, to the thermal lens 23.

In the multi-mode fiber 12A, the multi-mode light, which is inputted from the collimate lens 14f, is reflected by the total reflection mirror 17, which is formed at the one end opposite to the input side of the multi-mode light, and outputted to the collimate lens 14f through the reflection light path in the direction opposite to the input light path. Here, the dispersion compensation is made based on the dispersion slope characteristic depending on the status of mode of the multi-mode light, which is converted by the thermal lens 23.

The multi-mode light (chromatic dispersion has been compensated), which is reflected by the total reflection mirror 17 and outputted from the multi-mode fiber 12A, is inputted to the thermal lens 23 through the collimate lens 14f. Since the thermal lens 23 is configured as a reversible member, the multi-mode light of which chromatic dispersion has been compensated can be converted into 0th mode light and outputted therefrom. The 0th mode light, which has been dispersion compensated and outputted from the thermal lens 23, is outputted as the output light through the collimate lens 14e, the single mode fiber 11 and the optical circulator 16.

As described above, in the dispersion compensation device 20A according to the modification of the second embodiment of the present invention, since the total reflection mirror 17 is formed at one end of the multi-mode fiber 12A, in addition to the same advantages as those in the above-described first embodiment, the following advantage is obtained. That is, compared to the dispersion compensation device 20 (refer to FIG. 5) in the second embodiment, the number of the component parts such as collimate lens and thermal lens is reduced resulting in a large reduction of the space to be ensured as the light path. As a result, the compaction of the package as the dispersion compensation device can be achieved.

C Others

In addition to the above-described embodiments, the present invention can be carried out by variously modifying the same within the scope of the sprit of the present invention.

Also, based on the above-described embodiments, the device of the present invention can be manufactured.

What is claimed is:

1. A dispersion compensation device comprising:
   a first mode light conversion section capable of converting input light into light of higher mode,
   a dispersion compensation section capable of, with respect to the light of higher mode outputted from said first mode light conversion section, compensating a chromatic dispersion corresponding to the status of mode of said light of higher mode,
   a second mode light conversion section capable of, with respect to the light of higher mode dispersion-compensated in said dispersion compensation section, converting into light of original mode, and
   a mode control section capable of variably controlling the status of mode of the light of higher mode converted in said first mode light conversion section, and controlling to convert the light of higher mode from said dispersion compensation section to the light of original mode in said second mode light conversion section, wherein
   said first mode light conversion section is configured so as to convert light of basic mode outputted from a single mode fiber at an input side into the light of higher mode,
   said second mode light conversion section is configured so as to convert the light of higher mode dispersion-compensated in said dispersion compensation section into the light of basic mode and output the same to the single mode fiber at an output side, and
   the dispersion compensation device further comprising
   a first collimate lens interposed between said single mode fiber at the input side and said first mode light conversion section,
   a second collimate lens interposed between said first mode light conversion section and said dispersion compensation section,
   a third collimate lens interposed between said dispersion compensation section and said second mode light conversion section, and
   a fourth collimate lens interposed between said second mode light conversion section and said single mode fiber at the output side.

2. A dispersion compensation device comprising:
   a first mode light conversion section capable of converting input light into light of higher mode,
   a dispersion compensation section capable of, with respect to the light of higher mode outputted from said first mode light conversion section, compensating a chromatic dispersion corresponding to the status of mode of said light of higher mode,
   a second mode light conversion section capable of, with respect to the light of higher mode dispersion-compensated in said dispersion compensation section, converting into light of original mode, and
   a mode control section capable of variably controlling the status of mode of the light of higher mode converted in said first mode light conversion section, and controlling to convert the light of higher mode from said dispersion compensation section to the light of original mode in said second mode light conversion section, wherein
   said mode control section controls so as to vary the status of mode of the light of higher mode converted by said first mode light conversion section corresponding to the dispersion amount of the light outputted from said second mode light conversion section,
   said first mode light conversion section is configured so as to convert light of basic mode outputted from a single mode fiber at an input side into the light of higher mode,
   said second mode light conversion section is configured so as to convert the light of higher mode dispersion-compensated in said dispersion compensation section into the light of basic mode and output the same to the single mode fiber at an output side, and
   the dispersion compensation device further comprising
   a first collimate lens interposed between said single mode fiber at the input side and said first mode light conversion section,
   a second collimate lens interposed between said first mode light conversion section and said dispersion compensation section,
   a third collimate lens interposed between said dispersion compensation section and said second mode light conversion section, and
   a fourth collimate lens interposed between said second mode light conversion section and said single mode fiber at the output side.

3. A dispersion compensation device comprising:
   a first mode light conversion section capable of converting input light into light of higher mode,
   a dispersion compensation section capable of, with respect to the light of higher mode outputted from said first mode light conversion section, compensating a chromatic dispersion corresponding to the status of mode of said light of higher mode,
   a second mode light conversion section capable of, with respect to the light of higher mode dispersion-compensated in said dispersion compensation section, converting into light of original mode, and
   a mode control section capable of variably controlling the status of mode of the light of higher mode converted in said first mode light conversion section, and controlling to convert the light of higher mode from said dispersion compensation section to the light of original mode in said second mode light conversion section, wherein each of said first and second mode light conversion sections is comprised of an axicon lens capable of varying the status of mode of output light with respect to the input light based on the relative distance with respect to said dispersion compensation section, and said mode control section is comprised of a first relative distance variable section capable of variably setting relative distance of the axicon lens as said first mode light conversion section with respect to said dispersion compensation section, a second relative distance variable section capable of variably setting relative distance with respect to said dispersion compensation section of the axicon lens as said second mode light conversion section, a monitor section for monitoring the light from said second mode light conversion section, and a relative-distance setting control unit for controlling said first and second relative distance variable sections in order to set and control the relative distances with respect to said dispersion compensation section of the axicon lenses as said first and second mode light conversion sections based on the monitor result in said monitor section.

4. A dispersion compensation device comprising:

a first mode light conversion section capable of converting input light into light of higher mode, a dispersion compensation section capable of, with respect to the light of higher mode outputted from said first mode light conversion section, compensating a chromatic dispersion corresponding to the status of mode of said light of higher mode, a second mode light conversion section capable of, with respect to the light of higher mode dispersion-compensated in said dispersion compensation section, converting into light of original mode, and a mode control section capable of variably controlling the status of mode of the light of higher mode converted in said first mode light conversion section, and controlling to convert the light of higher mode from said dispersion compensation section to the light of original mode in said second mode light conversion section, wherein said mode control section controls so as to vary the status of mode of the light of higher mode converted by said first mode light conversion section corresponding to the dispersion amount of the light outputted from said second mode light conversion section, each of said first and second mode light conversion sections is comprised of an axicon lens capable of varying the status of mode of output light with respect to the input light based on the relative distance with respect to said dispersion compensation section, and said mode control section is comprised of a first relative distance variable section capable of variably setting relative distance of the axicon lens as said first mode light conversion section with respect to said dispersion compensation section, a second relative distance variable section capable of variably setting relative distance with respect to said dispersion compensation section of the axicon lens as said second mode light conversion section, a monitor section for monitoring the light from said second mode light conversion section, and a relative-distance setting control unit for controlling said first and second relative distance variable sections in order to set and control the relative distances with respect to said dispersion compensation section of the axicon lenses as said first and second mode light conversion sections based on the monitor result in said monitor section.

5. A dispersion compensation device comprising:

a first mode light conversion section capable of converting input light into light of higher mode, a dispersion compensation section capable of, with respect to the light of higher mode outputted from said first mode light conversion section, compensating a chromatic dispersion corresponding to the status of mode of said light of higher mode, a second mode light conversion section capable of, with respect to the light of higher mode dispersion-compensated in said dispersion compensation section, converting into light of original mode, and a mode control section capable of variably controlling the status of mode of the light of higher mode converted in said first mode light conversion section, and controlling to convert the light of higher mode from said dispersion compensation section to the light of original mode in said second mode light conversion section, wherein said first mode light conversion section is configured so as to convert light of basic mode outputted from a single mode fiber at an input side into the light of higher mode, said second mode light conversion section is configured so as to convert the light of higher mode dispersion-compensated in said dispersion compensation section into the light of basic mode and output the same to the single mode fiber at an output side, each of said first and second mode light conversion sections is comprised of an axicon lens capable of varying the status of mode of output light with respect to the input light based on the relative distance with respect to said dispersion compensation section, said mode control section is comprised of a first relative distance variable section capable of variably setting relative distance of the axicon lens as said first mode light conversion section with respect to said dispersion compensation section, a second relative distance variable section capable of variably setting relative distance with respect to said dispersion compensation section of the axicon lens as said second mode light conversion section, a monitor section for monitoring the light from said second mode light conversion section, and a relative-distance setting control unit for controlling said first and second relative distance variable sections in order to set and control the relative distances with respect to said dispersion compensation section of the axicon lenses as said first and second mode light conversion sections based on the monitor result in said monitor section.

6. A dispersion compensation device comprising:

a first mode light conversion section capable of converting input light into light of higher mode, a dispersion compensation section capable of, with respect to the light of higher mode outputted from said first mode light conversion section, compensating a chromatic dispersion corresponding to the status of mode of said light of higher mode, a second mode light conversion section capable of, with respect to the light of higher mode dispersion-compensated in said dispersion compensation section, converting into light of original mode, and a mode control section capable of variably controlling the status of mode of the light of higher mode converted in said first mode light conversion section, and controlling to convert the light of higher mode from said dispersion compensation section to the light of original mode in said second mode light conversion section, wherein said mode control section controls so as to vary the status of mode of the light of higher mode converted by said first mode light conversion section corresponding to the dispersion amount of the light outputted from said second mode light conversion section, said first mode light conversion section is configured so as to convert light of basic mode outputted from a single mode fiber at an input side into the light of higher mode, said second mode light conversion section is configured so as to convert the light of higher mode dispersion-compensated in said dispersion compensation section into the light of basic mode and output the same to the single mode fiber at an output side, each of said first and second mode light conversion sections is comprised of an axicon lens capable of varying the status of mode of output light with respect to the input light based on the relative distance with respect to said dispersion compensation section, and said mode control section is comprised of a first relative distance variable section capable of variably setting relative distance of the axicon lens as said first mode light conversion section with respect to said dispersion compensation section, a second relative distance variable section capable of variably setting relative distance with respect to said dispersion compensation section of the axicon lens as said second mode light conversion section, a monitor section for monitoring the light from said second mode light conversion section, and a relative-distance setting control unit for controlling said first and second relative distance variable sections in order to set and control the relative distances with respect to said dispersion compensation section of the axicon lenses as said first and second mode light conversion sections based on the monitor result in said monitor section.

7. The dispersion compensation device according to claim 1, wherein each of said first and second mode light conversion sections is comprised of an axicon lens capable of varying the status of mode of output light with respect to the input light based on the relative distance with respect to said dispersion compensation section;

said mode control section is comprised of a first relative distance variable section capable of variably setting relative distance of the axicon lens as said first mode light conversion section with respect to said dispersion compensation section, a second relative distance variable section capable of variably setting relative distance with respect to said dispersion compensation section of the axicon lens as said second mode light conversion section, a monitor section for monitoring the light from said second mode light conversion section, a relative-distance setting control unit for controlling said first and second relative distance variable sections in order to set and control the relative distances with respect to said dispersion compensation section of the axicon lenses as said first and second mode light conversion sections based on the monitor result in said monitor section.

8. The dispersion compensation device according to claim 2, wherein each of said first and second mode light conversion sections is comprised of an axicon lens capable of varying the status of mode of output light with respect to the input light based on the relative distance with respect to said dispersion compensation section;

said mode control section is comprised of a first relative distance variable section capable of variably setting relative distance of the axicon lens as said first mode light conversion section with respect to said dispersion compensation section, a second relative distance variable section capable of variably setting relative distance with respect to said dispersion compensation section of the axicon lens as said second mode light conversion section, a monitor section for monitoring the light from said second mode light conversion section, a relative-distance setting control unit for controlling said first and second relative distance variable sections in order to set and control the relative distances with respect to said dispersion compensation section of the axicon lenses as said first and second mode light conversion sections based on the monitor result in said monitor section.

9. A dispersion compensation device comprising:

a first mode light conversion section capable of converting input light into light of higher mode, a dispersion compensation section capable of, with respect to the light of higher mode outputted from said first mode light conversion section, compensating a chromatic dispersion corresponding to the status of mode of said light of higher mode, a second mode light conversion section capable of, with respect to the light of higher mode dispersion-compensated in said dispersion compensation section, converting into light of original mode, and a mode control section capable of variably controlling the status of mode of the light of higher mode converted in said first mode light conversion section, and controlling to convert the light of higher mode from said dispersion compensation section to the light of original mode in said second mode light conversion section, wherein each of said first and second mode light conversion sections is comprised of a thermal lens capable of varying the status of mode of output light from the thermal lens with respect to input light to the thermal lens based on intensity of control light inputted to the thermal lens along with the input light, said mode control section is comprised of a control light source that emits control light for varying the status of mode of the thermal lens as said first and second mode light conversion sections, a monitor section that monitors the light outputted from said second mode light conversion section, and a control light source control section that controls said control light source to set and control the changes in refractive index of thermal lenses as said first and second mode light conversion sections based on the monitor result in said monitor section.

10. A dispersion compensation device comprising:
a first mode light conversion section capable of converting input light into light of higher mode,
a dispersion compensation section capable of, with respect to the light of higher mode outputted from said first mode light conversion section, compensating a chromatic dispersion corresponding to the status of mode of said light of higher mode,
a second mode light conversion section capable of, with respect to the light of higher mode dispersion-compensated in said dispersion compensation section, converting into light of original mode, and
a mode control section capable of variably controlling the status of mode of the light of higher mode converted in said first mode light conversion section, and controlling to convert the light of higher mode from said dispersion compensation section to the light of original mode in said second mode light conversion section, wherein
said mode control section controls so as to vary the status of mode of the light of higher mode converted by said first mode light conversion section corresponding to the dispersion amount of the light outputted from said second mode light conversion section,
each of said first and second mode light conversion sections is comprised of a thermal lens capable of varying the status of mode of output light from the thermal lens with respect to input light to the thermal lens based on intensity of control light inputted to the thermal lens along with the input light,
said mode control section is comprised of
a control light source that emits control light for varying the status of mode of the thermal lens as said first and second mode light conversion sections,
a monitor section that monitors the light outputted from said second mode light conversion section, and
a control light source control section that controls said control light source to set and control changes in refractive index of the thermal lenses as said first and second mode light conversion sections based on the monitor result in said monitor section.

11. A dispersion compensation device comprising:
a first mode light conversion section capable of converting input light into light of higher mode,
a dispersion compensation section capable of, with respect to the light of higher mode outputted from said first mode light conversion section, compensating a chromatic dispersion corresponding to the status of mode of said light of higher mode,
a second mode light conversion section capable of, with respect to the light of higher mode dispersion-compensated in said dispersion compensation section, converting into light of original mode, and
a mode control section capable of variably controlling the status of mode of the light of higher mode converted in said first mode light conversion section, and controlling to convert the light of higher mode from said dispersion compensation section to the light of original mode in said second mode light conversion section, wherein
said first mode light conversion section is configured so as to convert light of basic mode outputted from a single mode fiber at an input side into the light of higher mode,
said second mode light conversion section is configured so as to convert the light of higher mode dispersion-compensated in said dispersion compensation section into the light of basic mode and output the same to the single mode fiber at an output side,
each of said first and second mode light conversion sections is comprised of a thermal lens capable of varying the status of mode of output light from the thermal lens with respect to input light to the thermal lens based on intensity of control light inputted to the thermal lens along with the input light, and
said mode control section is comprised of
a control light source that emits control light for varying the status of mode of the thermal lens as said first and second mode light conversion sections,
a monitor section that monitors the light outputted from said second mode light conversion section, and
a control light source control section that controls said control light source to set and control changes in refractive index of the thermal lenses as said first and second mode light conversion sections based on the monitor result in said monitor section.

12. A dispersion compensation device comprising:
a first mode light conversion section capable of converting input light into light of higher mode,
a dispersion compensation section capable of, with respect to the light of higher mode outputted from said first mode light conversion section, compensating a chromatic dispersion corresponding to the status of mode of said light of higher mode,
a second mode light conversion section capable of, with respect to the light of higher mode dispersion-compensated in said dispersion compensation section, converting into light of original mode, and
a mode control section capable of variably controlling the status of mode of the light of higher mode converted in said first mode light conversion section, and controlling to convert the light of higher mode from said dispersion compensation section to the light of original mode in said second mode light conversion section, wherein
said mode control section controls so as to vary the status of mode of the light of higher mode converted by said first mode light conversion section corresponding to the dispersion amount of the light outputted from said second mode light conversion section,
said first mode light conversion section is configured so as to convert light of basic mode outputted from a single mode fiber at an input side into the light of higher mode,
said second mode light conversion section is configured so as to convert the light of higher mode dispersion-compensated in said dispersion compensation section into the light of basic mode and output the same to the single mode fiber at an output side, each of said first and second mode light conversion sections is comprised of a thermal lens capable of varying the status of mode of output light from the thermal lens with respect to input light to the thermal lens based on intensity of control light inputted to the thermal lens along with the input light, and said mode control section is comprised of a control light source that emits control light for varying the status of mode of the thermal lens as said first and second mode light conversion sections, a monitor section that monitors the light outputted from said second mode light conversion section, and a control light source control section that controls said control light source to set and control changes in refractive index of the thermal lenses as said first and second mode light conversion sections based on the monitor result in said monitor section.

13. The dispersion compensation device according to claim 1, wherein each of said first and second mode light conversion sections is comprised of a thermal lens capable of varying the status of mode of output light from the thermal lens with respect to input light to the thermal lens based on intensity of control light inputted to the thermal lens along with the input light, and said mode control section is comprised of a control light source that emits control light for varying the status of mode of the thermal lens as said first and second mode light conversion sections, a monitor section that monitors the light outputted from said second mode light conversion section, and a control light source control section that controls said control light source to set and control changes in refractive index of the thermal lenses as said first and second mode light conversion sections based on the monitor result in said monitor section.

14. The dispersion compensation device according to claim 2, wherein each of said first and second mode light conversion sections is comprised of a thermal lens capable of varying the status of mode of output light from the thermal lens with respect to input light to the thermal lens based on intensity of control light inputted to the thermal lens along with the input light, and said mode control section is comprised of a control light source that emits control light for varying the status of mode of the thermal lens as said first and second mode light conversion sections, a monitor section that monitors the light outputted from said second mode light conversion section, and a control light source control section that controls said control light source to set and control changes in refractive index of the thermal lenses as said first and second mode light conversion sections based on the monitor result in said monitor section.

15. The dispersion compensation device according to claim 3, wherein said mode control section controls so as to vary the status of mode of the light of higher mode converted by said first mode light conversion section corresponding to a dispersion amount of the light outputted from said second mode light conversion section.

16. The dispersion compensation device according to claim 15, wherein said first mode light conversion section is configured so as to convert light of basic mode outputted from a single mode fiber at an input side into the light of higher mode, said second mode light conversion section is configured so as to convert the light of higher mode dispersion-compensated in said dispersion compensation section into the light of basic mode and output the same to a single mode fiber at an output side.

17. The dispersion compensation device according to claim 3, wherein said first mode light conversion section is configured so as to convert light of basic mode outputted from a single mode fiber at an input side into the light of higher mode, said second mode light conversion section is configured so as to convert the light of higher mode dispersion-compensated in said dispersion compensation section into the light of basic mode and output the same to a single mode fiber at an output side.

18. The dispersion compensation device according to claim 3, wherein said dispersion compensation section is comprised of a multi-mode fiber.

19. The dispersion compensation device according to claim 18, wherein said multi-mode fiber is configured so as to be inputted with said light of higher mode from said first mode light conversion section from one end thereof and to output said dispersion-compensated light from the other end opposite to said one end, and said first mode light conversion section, said multi-mode fiber and said second mode light conversion section are disposed in one direction in this order.

20. The dispersion compensation device according to claim 18, wherein said multi-mode fiber is configured with, at the other end opposite to one end to which said light of higher mode is inputted from said first mode light conversion section, a reflection member for reflecting light propagating said multi-mode fiber to output said dispersion-compensated light from the one end to which said light of higher mode is inputted, and said first and second mode light conversion sections are commonly used as reversible members.

21. The dispersion compensation device according to claim 9, wherein said mode control section controls so as to vary a status of mode of the light of higher mode converted by said first mode light conversion section corresponding to a dispersion amount of the light outputted from said second mode light conversion section.

22. The dispersion compensation device according to claim 21, wherein said first mode light conversion section is configured so as to convert light of basic mode outputted from a single mode fiber at an input side into the light of higher mode, said second mode light conversion section is configured so as to convert the light of higher mode dispersion-compensated in said dispersion compensation section into the light of basic mode and output the same to a single mode fiber at an output side.

23. The dispersion compensation device according to claim 9, wherein said first mode light conversion section is configured so as to convert light of basic mode outputted from the single mode fiber at the input side into the light of higher mode, said second mode light conversion section is configured so as to convert the light of higher mode dispersion-compensated in said dispersion compensation section into the light of basic mode and output the same to the single mode fiber at the output side.

24. The dispersion compensation device according to claim 9, wherein said dispersion compensation section is comprised of a multi-mode fiber.

25. The dispersion compensation device according to claim 24, wherein said multi-mode fiber is configured so as to be inputted with said light of higher mode from said first mode light conversion section from one end thereof and to output said dispersion-compensated light from the other end opposite to said one end, and said first mode light conversion section, said multi-mode fiber and said second mode light conversion section are disposed in one direction in this order.

26. The dispersion compensation device according to claim 24, wherein said multi-mode fiber is configured with, at the other end opposite to one end to which said light of higher mode is inputted from said first mode light conversion section, a reflection member for reflecting light propagating said multi-mode fiber to output said dispersion-compensated light from the one end to which said light of higher mode is inputted, and said first and second mode light conversion sections are commonly used as reversible members.

* * * * *

UNITED STATES PATENT AND TRADEMARK OFFICE
CERTIFICATE OF CORRECTION

PATENT NO. : 7,269,314 B2  
APPLICATION NO. : 11/048816  
DATED : September 11, 2007  
INVENTOR(S) : Yoichi Oikawa Page 1 of 1

It is certified that error appears in the above-identified patent and that said Letters Patent is hereby corrected as shown below:

On Title page  
Below "(65) Prior Publication Data  
US 2006/0127001 A1  Jun. 15, 2006"

insert

Item --(30) Foreign Application Priority Data  
Nov. 18, 2004    (JP) ............. 2004-334638--

Signed and Sealed this

Eighth Day of April, 2008

JON W. DUDAS  
*Director of the United States Patent and Trademark Office*